United States Patent [19]

Nahr et al.

[11] Patent Number: 4,923,988
[45] Date of Patent: May 8, 1990

[54] PREPARATION OF TRIPHENDIOXAZINES

[75] Inventors: Uwe Nahr, Dannstadt-Schauernheim; Manfred Pastsch, Wachenheim, both of Fed. Rep. of Germany

[73] Assignee: BASF Aktiengesellschaft, Ludwigshafen, Fed. Rep. of Germany

[21] Appl. No.: 257,807

[22] Filed: Oct. 14, 1988

[30] Foreign Application Priority Data

Oct. 16, 1987 [DE] Fed. Rep. of Germany ....... 3735057

[51] Int. Cl.$^5$ ........................................... C07D 498/04
[52] U.S. Cl. ......................................... 544/74; 544/75; 544/76; 544/77
[58] Field of Search ....................... 544/74, 75, 76, 77

[56] References Cited

U.S. PATENT DOCUMENTS 4,532,323  7/1985  Jäger ..................................... 544/75

Primary Examiner—Richard L. Raymond
Attorney, Agent, or Firm—Oblon, Spivak, McClelland, Maier & Neustadt

[57] ABSTRACT

Triphendioxazines are prepared by cyclizing benzoquinone derivatives in oleum in the presence of an organic iodine compound.

8 Claims, No Drawings

PREPARATION OF TRIPHENDIOXAZINES

The present invention relates to a novel process for preparing triphendioxazines by cyclizing benzoquinone derivatives in oleum in the presence of an organic iodine compound.

EP-A-141,359 discloses the preparation of triphendioxazine compounds by reacting 2,5-diarylaminobenzoquinone derivatives with oleum in the presence of iodine or an inorganic iodine compound. In the example described therein, a relatively high amount of potassium iodide is used, namely 0.1 mole per mole of benzoquinone derivative. In addition, the presence of elemental iodine is absolutely necessary, since under the reaction conditions even the inorganic iodine compounds are converted into elemental iodine.

It is an object of the present invention to provide a new process for preparing triphendioxazines requiring only small amounts of catalyst and avoiding the presence of elemental iodine.

We have found that this object is achieved with a process of preparing a triphendioxazine of the formula I

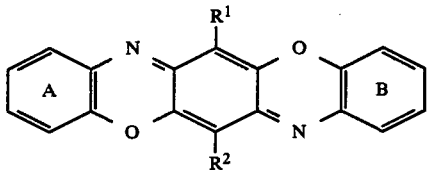

where $R^1$ and $R^2$ are identical or different and each is independently of the other hydrogen, $C_1-C_4$-alkyl, $C_1-C_4$-alkoxy, halogen, substituted or unsubstituted phenyl or substituted or unsubstituted phenoxy and the rings A and B are identical or different and each is independently of the other substituted or unsubstituted and/or fused with carbocyclic or heterocyclic rings, by cyclizing a benzoquinone of the formula II

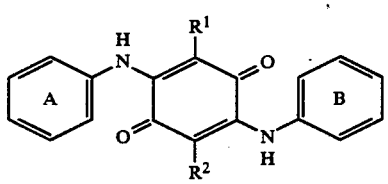

where $R^1$, $R^2$ and the rings A and B are each as defined above, in oleum as the reaction medium and in the presence of an organic iodine compound.

All the alkyl radicals appearing in the above-mentioned formulae I and II may be not only straight-chain but also branched.

If substituted phenyl radicals appear in the above-mentioned formulae I and II, suitable substituents are for example $C_1-C_4$-alkyl, $C_1-C_4$-alkoxy, amino, hydroxysulfonyl or halogen.

If the rings A and/or B are substituted, suitable substituents (hereinafter referred to as $R^3$) are for example substituted or unsubstituted $C_1-C_4$-alkyl, $C_5-C_7$-cycloalkyl, phenyl, benzyl, $C_1-C_4$-alkoxy, $C_5-C_7$-cycloalkoxy, substituted or unsubstituted phenoxy, phenylthio, amino, substituted or unsubstituted $C_1-C_4$-alkylamino, $C_5-C_7$-cycloalkylamino, substituted or unsubstituted phenylamino, benzylamino, $C_1-C_4$-alkanoylamino, halogen, carboxyl, hydroxysulfonyl, sulfamoyl or 2-sulfatoethylsulfonyl.

If $R^3$ is substituted phenyl, suitable substituents, in addition to these mentioned above, are for example hydroxyl, $C_1-C_4$-mono- or -dialkyl-amino, carboxyl, $C_1-C_4$-alkanoylamino, sulfato or 2-sulfatoethylsulfonyl.

Alkyls $R^3$ may be substituted for example by amino, $C_1-C_4$-mono- or -dialkyl-amino, hydroxyl, $C_1-C_4$-alkoxy, hydroxysulfonyl, carboxyl, $C_1-C_4$-alkanoylamino, sulfato or 2-sulfatoethylsulfonyl.

Those substituents $R^3$ bonded to the rings A and/or B via oxygen or nitrogen are preferably in the para-position relative to the nitrogen atom.

The radicals $R^1$, $R^2$ and $R^3$ are for example methyl, ethyl, propyl, isopropyl, butyl, isobutyl, sec-butyl, methoxy, ethoxy, propoxy, isopropoxy, butoxy, isobutoxy, sec-butoxy, fluorine, chlorine or bromine.

The radicals $R^1$ and $R^2$ are further for example 4-methylphenyl, 2,4-dimethylphenyl, 2-methoxyphenyl, 4-ethoxyphenyl, 4-isopropoxyphenyl, 4-chlorophenyl, 4-bromophenyl, 2,4-dichlorophenyl, 2,6-dichlorophenyl, 2-methylphenoxy, 4-methylphenoxy, 4-methoxyphenoxy or 4-chlorophenoxy.

Radicals $R^3$ are further for example cyclopentyl, cyclohexyl, cycloheptyl, cyclopentyloxy, cyclohexyloxy, cycloheptyloxy, phenoxy, 3-aminophenoxy, 4-aminophenoxy, methylamino, ethylamino, propylamino, isopropylamino, bytylamino, 2-aminoethylamino, 3-aminopropylamino, 3-amino-2-methylpropylamino, 2-hydroxyethylamino, 2-hydroxysulfonylaminoethylamino, 2-sulfatoethylamino, cyclopentylamino, cyclohexylamino, cycloheptylamino, phenylamino, 3-aminophenylamino, 4-aminophenylamino, formylamino, acetylamino, propionylamino, butyrylamino or isobutyrylamino.

If the rings A and/or B are fused with carbocyclic or heterocyclic rings, suitable rings for this purpose are for example the benzo ring, the indan ring system or the indole ring system, these ring systems being unsubstituted or further substituted by amino, $C_1-C_4$-mono- or -dialkyl-amino, $C_1-C_4$-alkoxy, hydroxysulfonyl, carboxyl, $C_1-C_4$-alkanoylamino or 2-sulfatoethylsulfonyl.

Organic iodine compounds suitable for the process according to the invention are for example aliphatic iodine compounds, such as methyl iodide, diiodomethane, chloroiodomethane, iodoform, tetraiodomethane, ethyl iodide, ethylene iodide, 2-iodoethanol, iodoacetamide, idodacetonitrile, trifluoroethyl iodide, iodoacetic acid and salts thereof, iodoacetic esters (eg. nitrophenyl iodoacetate), propyl iodide, isopropyl iodide, allyl iodide, 1,3-diiodopropane, butyl iodide, isobutyl iodide, sec-butyl iodide, tert-butyl iodide, perfluorobutyl iodide, iodomethyltrimethylsilane, 1-iodopentane, 1-iodo-3-methylbutane, 2,2-dimethyl-1-iodopropane, 1-iodohexane or 1,10-diododecane, or aromatic iodine compounds, such as iodobenzene, iodotoluene, iodophenol, iodanisole, iodoaniline, iodobenzoic acid or iodonaphthalene, these aromatic ring systems being unsubstituted or further substituted by hydrogen, $C_1-C_4$-alkoxy, nitro, amino, carboxyl or hydroxysulfonyl.

Preference is given to using iodoform, iodobenzene or mixtures thereof as the organic iodine compound.

This organic iodine compound is used in an amount of from 0.0005 to 0.1 mole, preferably 0.0005 to 0.01 mole, in particular 0.001 to 0.01 mole, each per mole of benzoquinone II. The organic iodine compounds may of course also be used in amounts which are greater than those stated here. However, this has no further favorable effect on the process.

The process according to the invention is carried out at from 0° to 50° C., preferably at from 5° to 25° C., in oleum.

Advantageously, the oleum used contains from 2 to 40% by weight, preferably from 20 to 40% by weight, of sulfur trioxide.

Per part by weight of benzoquinone II to be cyclized, it is advantageous to use from 5 to 20 parts by weight, preferably from 7 to 12 parts by weight, of oleum.

The process according to the invention is advantageously carried out by initially introducing the oleum, then, with or without cooling, adding the benzoquinone derivative of the formula II and the organic iodine compound and thereafter stirring the mixture at the above-mentioned temperature for from about 0.5 to 5 hours. The reaction mixture is then carefully discharged onto ice. The triphendioxazine of the formula I which is formed is filtered off with suction, washed with water and dried.

A preferred embodiment of the process according to the invention comprises performing the cyclization in the presence of an oxidizing agent. Suitable oxidizing agents are for example oxygen or alkali metal or ammonium peroxodisulfate. The use of oxygen, in particular in the form of dry air, is preferred. If air is used as the oxidizing agent, it is passed into the reaction mixture in the course of the reaction. If an alkali metal or ammonium peroxodisulfate is used as the oxidizing agent, it is added to the reaction mixture in an amount of from 0.001 to 0.1 mole per mole of starting material II.

The advantages of the process according to the invention are that the cyclization gives uniform products in very good yields and requires only small amounts of organic iodine compound, and the presence of elemental iodine is avoided.

The triphendioxazines of the formula I are useful intermediates for the synthesis of reactive dyes and paper dyes.

The following Examples, where the percentages are by weight, will illustrate the invention in more detail:

EXAMPLE 1

19.05 g of the compound

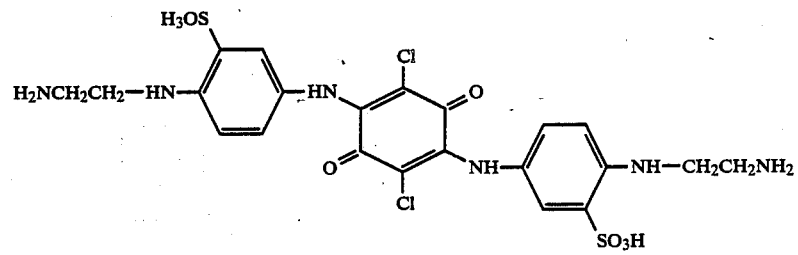

were added at 20°-25° C. to a mixture of 75.6 g of 20% strength oleum and 59.0 g of 65% strength oleum. After 0.115 g of iodoform had been added, the mixture was stirred at 20°-25° C. with cooling for 1 hour. After the reaction had ended (thin layer chromatography), the reaction mixture was discharged onto 400 g of ice and 100 g of water, and the resulting mixture was brought to pH 6 with sodium hydroxide solution. Filtering with suction and drying left 18.5 g of a blue powder containing predominantly the compounds of the formula

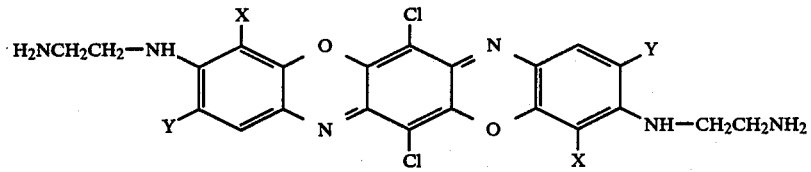

where one each of the X and Y radicals is hydroxysulfonyl while the other is hydrogen.

EXAMPLE 2

19.05 g of the compound of the formula

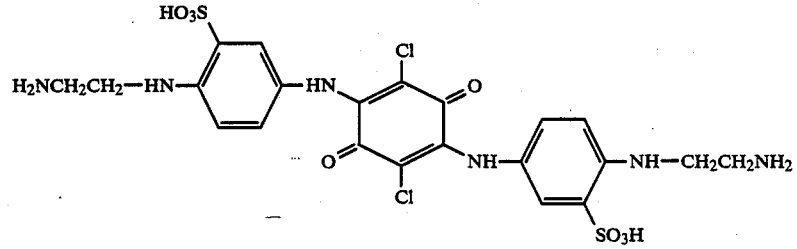

were added at 20°-25° C. to a mixture of 75.6 g of 20% strength oleum and 59.0 g of 60% strength oleum. After 0.4 g of iodobenzene had been added, the reaction mixture was stirred for 5 hours during which dry air was passed in. After the reaction had ended (thin layer chromatography), the reaction mixture was discharged onto 400 g of ice and 100 g of water, and the resulting mixture was brought to pH 6 with sodium hydroxide solution. Filtering with suction and drying left 18.2 g of blue powder containing predominantly the compounds of the formula

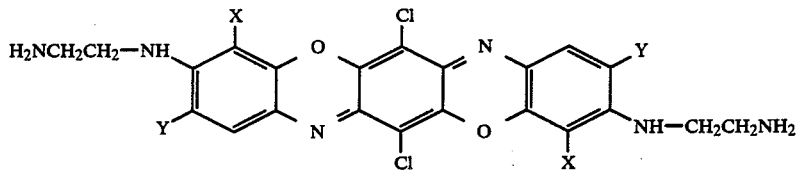

where one each of the X and Y radicals is hydroxysulfonyl while the other is hydrogen.

The same method was used to prepare the triphendioxazines of the formula listed in the following table:

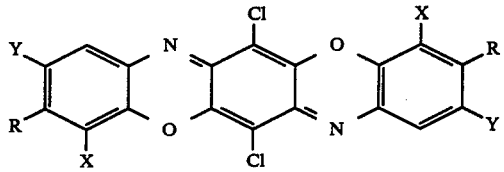

| Compound No. | R | X, Y |
|---|---|---|
| 3 | CH₃ \| NH—CH₂—CH—NH₂ | SO₃H, H |
| 4 | NH—(CH₂)₃—NH₂ | SO₃H, H |
| 5 | NH—⌬—NH₂ | SO₃H, H |
| 6 | NH—(CH₂)₂—NH₂ | SO₂—(CH₂)₂—OSO₃H, H |
| 7 | NH—(CH₂)₂—SO₃H | SO₂—(CH₂)₂—OSO₃H, H |
| 8 | NH—⌬ | SO₂—(CH₂)₂—SO₃H, H |
| 9 | O—(CH₂)₂—NH₂ | SO₃H, H |
| 10 | O—⌬—NH₂ | SO₃H, H |

We claim:
1. A process for preparing triphendioxazine of the formula (I):

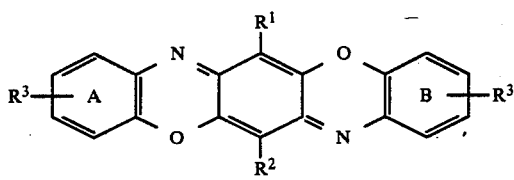

wherein $R^1$ and $R^2$ are identical or different and each is independently hydrogen, $C_1$-$C_4$-alkyl, $C_1$-$C_4$-alkoxy, halogen, phenyl, phenyl substituted by $C_1$-$C_4$-alkyl, $C_1$-$C_4$-alkoxy, amino, hydroxysulfonyl or halogen; phenoxy or phenoxy substituted by methyl, methoxy or chloro; and wherein rings A and B are identical or different and each is independently of the other unsubstituted or substituted by $R^3$, wherein $R^3$ is hydrogen, $C_1$-$C_4$ alkyl, $C_1$-$C_4$ alkyl substituted by amino, $C_1$-$C_4$-mono- or dialkylamino, hydroxyl, $C_1$-$C_4$-alkoxy, hydroxylsulfonyl, carboxyl, $C_1$-$C_4$-alkanoylamino, sulfato or 2-sulfatoethylsulfonyl, phenyl, phenyl substituted by hydroxyl, $C_1$-$C_4$-mono- or dialkylamino, carboxyl, $C_1$-$C_4$-alkanoylamino, sulfato or 2-sulfatoethylsulfonyl; phenoxy, phenoxy substituted by amino, benzyl, $C_1$-$C_4$-alkoxy, $C_5$-$C_7$-cycloalkoxy, phenylthio, amino, $C_1$-$C_4$-alkylamino, $C_1$-$C_4$-alkylamino substituted by lower alkyl, amino, hydroxy, hydroxysulfonyl or 2-sulfatoethyl; $C_5$-$C_7$-cycloalkylamino, phenylamino, phenylamino substituted by amino, benzylamino, $C_1$-$C_4$-alkanoylamino, halogen carboxyl, hydroxysulfonyl, sulfamoyl or 2-sulfatoethylsulfonyl; or wherein said rings A and B are fused to a benzo ring, an indan ring or indole ring, which benzo, indan or indole rings are unsubstituted or substituted by amino, $C_1$-$C_4$-mono- or a dialkylamino, $C_1$-$C_4$-alkoxy, hydroxylsulfonyl, or carboxyl, $C_1$-$C_4$-alkanoylamino or 2-sulfatoethylsulfonyl, which process comprises:

cyclizing a benzoquinone of the formula (II):

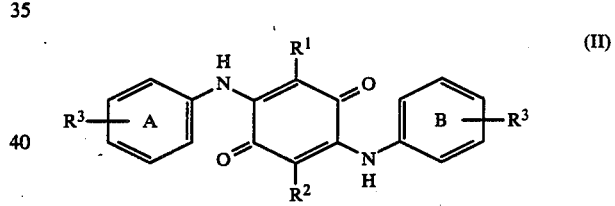

wherein $R^1$, $R^2$, $R^3$ and rings A and B are as defined above, in oleum as the reaction medium and in the presence of an effective amount of an organic iodine compound.

2. The process as claimed in claim 1, wherein the cyclization is carried out in the presence of from 0.0005 to 0.1 mole, based on one mole of benzoquinone of the formula (II), of an organic iodine compound.

3. The process as claimed in claim 1, wherein said organic iodine compound is selected from the group consisting of iodoform, iodobenzene and a mixture thereof.

4. The process as claimed in claim 1, wherein the cyclization is effected at from 0° to 50° C.

5. A process for preparing a triphendioxazine of the formula (I):

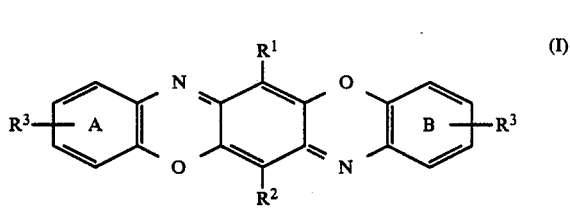

wherein $R^1$ and $R^2$ are identical or different and each is independently hydrogen, $C_1$–$C_4$-alkyl, $C_1$–$C_4$-alkoxy, halogen, phenyl, phenyl substituted by $C_1$–$C_4$-alkyl, $C_1$–$C_4$-alkoxy, amino, hydroxysulfonyl or halogen; phenoxy or phenoxy substituted by methyl, methoxy or chloro; and wherein rings A and B are identical or different and each is independently of the other unsubstituted or substituted by $R^3$, wherein $R^3$ is hydrogen, $C_1$–$C_4$ alkyl, $C_1$–$C_4$ alkyl substituted by amino, $C_1$–$C_4$-mono- or dialkylamino, hydroxyl, $C_1$–$C_4$-alkoxy, hydroxylsulfonyl, carboxyl, $C_1$–$C_4$-alkanoylamino, sulfato or 2-sulfatoethylsulfonyl, phenyl, phenyl substituted by hydroxyl, $C_1$–$C_4$-mono- or dialkylamino, carboxyl, $C_1$–$C_4$-alkanoylamino, sulfato or 2-sulfatoethylsulfonyl; phenoxy, phenoxy substituted by amino, benzyl, $C_1$–$C_4$-alkoxy, $C_5$–$C_7$-cycloalkoxy, phenylthio, amino, $C_1$–$C_4$-alkylamino, $C_1$–$C_4$-alkylamino, $C_1$–$C_4$-alkylamino substituted by lower alkyl, amino, hydroxy, hydroxysulfonyl or 2-sulfatoethyl; $C_5$–$C_7$-cycloalkylamino, phenylamino, phenylamino substituted by amino, benzylamino, $C_1$–$C_4$-alkanoylamino, halogen, carboxyl, hydroxysulfonyl, sulfamoyl, or 2-sulfatoethylsulfonyl; or wherein said rings A and B are fused to a benzo ring, an indan ring or indole ring, which benzo, indan or indole rings are unsubstitued or substituted by amino, $C_1$–$C_4$-mono- or a dialkylamino, $C_1$–$C_4$-alkoxy, hydroxylsulfonyl, or carboxyl, $C_1$–$C_4$-alkanoylamino or 2-sulfatoethylsulfonyl, which process comprises:

cyclizing a benzoquinone of the formula (II):

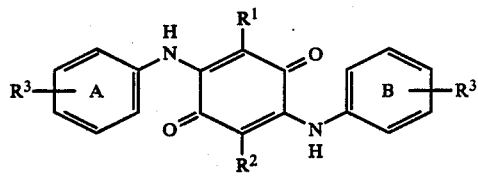

wherein $R^1$, $R^2$, $R^3$ and rings A and B are as definedabove in oleum as the reaction medium and in the presence of from 0.0005 to 0.001 mole of an organic iodine compound per mole of said benzoquinone of the formula (II).

6. The process as claimed in claim 5, wherein said organic iodine compound is selected from the group consisting of iodoform, iodobenzene or a mixture thereof.

7. The process as claimed in claim 5, wherein the cyclization is effected at from 0° to 50° C.

8. A process for preparing triphendioxazine of the formula (I):

wherein $R^1$ and $R^2$ are identical or different and each is independently hydrogen, $C_1$–$C_4$-alkyl, $C_1$–$C_4$-alkoxy, halogen, phenyl, phenyl substituted by $C_1$–$C_4$-alkyl, $C_1$–$C_4$-alkoxy, amino, hydroxysulfonyl or halogen; phenoxy or phenoxy substituted by methyl, methoxy or chloro; and wherein rings A and B are identical or different and each is independently of the other unsubstituted or substituted by $R^3$, wherein $R^3$ is hydrogen, $C_1$–$C_4$ alkyl, $C_1$–$C_4$ alkyl substituted by amino, $C_1$–$C_4$-mono- or dialkylamino, hydroxyl, $C_1$–$C_4$-alkoxy, hydroxylsulfonyl, carboxyl, $C_1$–$C_4$-alkanoylamino, sulfato or 2-sulfatoethylsulfonyl, phenyl, phenyl substituted by hydroxyl, $C_1$–$C_4$-mono- or dialkylamino, carboxyl, $C_1$–$C_4$-alkanoylamino, sulfato or 2-sulfatoethylsulfonyl; phenoxy, phenoxy substituted by amino, benzyl, $C_1$–$C_4$-alkoxy, $C_5$–$C_7$-cycloalkoxy, phenylthio, amino, $C_1$–$C_4$-alkylamino, $C_1$–$C_4$-alkylamino substituted by lower alkyl, amino, hydroxy, hydroxysulfonyl or 2-sulfatoethyl; $C_5$–$C_7$-cycloalkylamino, phenylamino, phenylamino substituted by amino, benzylamino, $C_1$–$C_4$-alkanoylamino, halogen, carboxyl, hydroxysulfonyl, sulfamoyl or 2-sulfatoethylsulfonyl; or wherein said rings A and B are fused to a benzo ring, an indan ring or indole ring, which benzo, indan or indole rings are unsubstituted or substituted by amino, $C_1$–$C_4$-mono- or a dialkylamino, $C_1$–$C_4$-alkoxy, hydroxylsulfonyl, or carboxyl, $C_1$–$C_4$-alkanoylamino or 2-sulfatoethylsulfonyl, which process comprises:

cyclizing a benzoquinone of the formula (II):

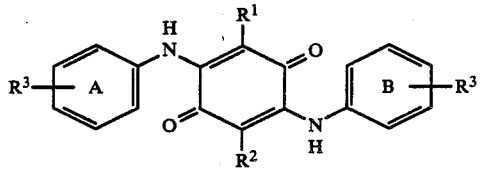

wherein $R^1$, $R^2$, $R^3$ and rings A and B are as defined above, in oleum as the reaction medium and in the presence of an effective amount of an organic iodine compound, and an effective amount of an oxidizing agent selected from the group consisting of oxygen, alkali metal peroxodisulfates, ammonium peroxodisulfate and a mixture thereof.

* * * * *